United States Patent
Berg et al.

(10) Patent No.: US 11,690,008 B2
(45) Date of Patent: Jun. 27, 2023

(54) SAVING POWER IN REMOTE RADIO HEADS

(71) Applicant: TELEFONAKTIEBOLAGET LM ERICSSON (PUBL), Stockholm (SE)

(72) Inventors: Miguel Berg, Sollentuna (SE); Chenguang Lu, Sollentuna (SE); Daniel Cederholm, Sollentuna (SE); André Mendes Cavalcante, Indaiatuba (BR)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 207 days.

(21) Appl. No.: 17/256,927

(22) PCT Filed: Aug. 24, 2018

(86) PCT No.: PCT/SE2018/050857
§ 371 (c)(1),
(2) Date: Dec. 29, 2020

(87) PCT Pub. No.: WO2020/018008
PCT Pub. Date: Jan. 23, 2020

(65) Prior Publication Data
US 2021/0289439 A1    Sep. 16, 2021

Related U.S. Application Data
(60) Provisional application No. 62/700,976, filed on Jul. 20, 2018.

(51) Int. Cl.
*H04W 52/02* (2009.01)
(52) U.S. Cl.
CPC .............................. *H04W 52/0206* (2013.01)

(58) Field of Classification Search
CPC .................................................. H04W 52/0206
(Continued)

(56) References Cited

U.S. PATENT DOCUMENTS

| 8,838,177 B2 | 9/2014 | Lin et al. |
| 2011/0312353 A1* | 12/2011 | Banister ............... H04B 7/0691 |
| | | 455/500 |
| 2014/0003278 A1 | 1/2014 | Banister et al. |

FOREIGN PATENT DOCUMENTS

| WO | 2017061915 A1 | 4/2017 |
| WO | 2018102127 A1 | 6/2018 |

OTHER PUBLICATIONS

Communication pursuant to Article 94(3) EPC in corresponding/related European Application No. 18765507.1 dated Mar. 4, 2022.
(Continued)

*Primary Examiner* — Gbemileke J Onamuti
(74) *Attorney, Agent, or Firm* — Patent Portfolio Builders PLLC (57) ABSTRACT

Embodiments presented herein relates to a method for saving power in remote radio heads (RRHs) of a wireless communication system. The method is performed in an RRH controller node associated with a plurality of RRHs or the same cell, each of the plurality of RRHs having at least a first antenna branch A of the cell and a second antenna branch B of the cell. The method comprises providing S120 a first power saving indication to a first RRH of the plurality of RRHs, to inactivate its first antenna branch A, and providing S120 a second power saving indication to a second RRH of the plurality of RRHs, to inactivate its second antenna branch B, wherein at least one antenna branch is kept active in the first and second RRH. RRH controller nodes, a computer programs and a computer program product for saving power in RRHs of a wireless communication system are also presented.

23 Claims, 5 Drawing Sheets

(58) Field of Classification Search
USPC .......................................................... 370/311
See application file for complete search history.

(56) References Cited

OTHER PUBLICATIONS

International Search Report/Written Opinion dated Feb. 28, 2019 in related/corresponding PCT Application No. PCT/SE2018/050857.

* cited by examiner

SAVING POWER IN REMOTE RADIO HEADS

TECHNICAL FIELD

The invention relates to a method, a remote radio head controller node, a computer program and a computer program product for saving power in remote radio heads.

BACKGROUND

Many wireless communication systems have similar power consumption for high and low traffic load. Future high-capacity 5G wireless systems may have higher power consumption than today's 4G wireless systems, which means that energy optimizations will be important. It is for example of interest to be able to reduce power consumption when user traffic load is low, e.g. during night time or weekends in enterprise deployments. Over time, this would mean that energy consumption becomes lower. Reducing energy consumption will lead to lower operational cost and is also beneficial for the environment. Further, for buildings with active cooling, less cooling will be needed, further lowering the cost.

A known method of saving power for remote radio heads is to disable access points or radio heads that are not used. This works well if there is no traffic at all, but can lead to substantial coverage and capacity degradation if there is non-zero traffic load. In indoor environments, users close to an access point that is being switched off might experience link budget degradations in the order of 20-50 dB.

Another known method of saving power is proposed in U.S. Pat. No. 8,838,177, wherein the whole cell is reconfigured from a multiple-input multiple-output (MIMO) cell to a non-MIMO cell when a first condition is met and reconfigured back to a MIMO cell when a second condition is met. While this can achieve significant power savings, it also degrades coverage noticeably. By disabling MIMO, diversity gain is lost and power is reduced, which can lead to lack of coverage for users at the cell borders. A further disadvantage is that it requires signalling to inform UEs about the change before reconfiguring the cell.

SUMMARY

According to a first aspect there is presented a method for saving power in remote radio heads (RRHs) of a wireless communication system. The method is performed in an RRH controller node associated with a plurality of RRHs for the same cell, each of the plurality of RRHs having at least a first antenna branch of the cell and a second antenna branch of the cell. The method comprises providing a first power saving indication to a first RRH of the plurality of RRHs, to inactivate its first antenna branch, and providing a second power saving indication to a second RRH of the plurality of RRHs, to inactivate its second antenna branch, wherein at least one antenna branch is kept active in the first and second RRH.

By the presented method, power saving is enabled wherein wireless terminals can access a wireless communication system with reduced capacity without additional signalling, and also without serious link budget degradations.

The plurality of RRHs may be coupled to an intermediate radio unit (IRU) for the cell, the IRU comprising a combiner for each of the antenna branches in the uplink direction, the method further comprising providing an inactivation indication to the IRU, to inactivate its combiner inputs corresponding to the first antenna branch of the first RRH and the second antenna branch of the second RRH.

The antenna branches may be inactivated by muting or disabling.

The first and second RRH may be adjacent RRHs with partially overlapping coverage areas.

The method may further comprise obtaining power saving parameters of the cell, and determining the first and second power saving indications based on the obtained power saving parameters. The power saving parameters may comprise one or more of the following: traffic load, presence detection, aggregated power, individual RRH power, temperature, timeout, and configuration change. The determination step may be based on one or more of the following: deployment planning, signal strength measurement, randomness, and timeout, as well as applying machine learning to refine the determination over time.

The RRH controller node may be implemented in one or more of the following nodes: RRH, IRU, base station, core network, and external network.

The first antenna branch may be kept active in at least one of the plurality of RRHs.

The second antenna branch may be kept active in at least one of the plurality of RRHs.

According to a second aspect there is presented an RRH controller node for saving power in RRHs of a wireless communication system. The RRH controller node is associated with a plurality of RRHs for the same cell, each of the plurality of RRHs having at least a first antenna branch of the cell and a second antenna branch of the cell. The RRH controller node comprises a processing circuitry and a computer program product storing instructions that, when executed by the processing circuitry, causes the RRH controller node to provide a first power saving indication to a first RRH of the plurality of RRHs, to inactivate its first antenna branch and to provide a second power saving indication to a second RRH of the plurality of RRHs, to inactivate its second antenna branch, wherein at least one antenna branch is kept active in the first and second RRH.

The plurality of RRHs may be coupled to an IRU for the cell, the IRU comprising a combiner for each of the antenna branches in the uplink direction, the RRH controller node further caused to provide an inactivation indication to the IRU, to inactivate its combiner inputs corresponding to the first antenna branch of the first RRH and the second antenna branch of the second RRH.

The antenna branches may be inactivated by muting or disabling.

The first and second RRH may be adjacent RRHs with partially overlapping coverage areas.

The RRH controller node may further be caused to obtain power saving parameters of the cell and to determine the first and second power saving indications based on the obtained power saving parameters. The power saving parameters may comprise one or more of the following: traffic load, presence detection, aggregated power, individual RRH power, temperature, timeout, and configuration change. The determination action may be based on one or more of the following: deployment planning, signal strength measurement, randomness, and timeout, as well as applying machine learning to refine the determination over time.

The RRH controller node may be implemented in one or more of the following nodes: RRH, IRU, base station, core network, and external network.

The first antenna branch may be kept active in at least one of the plurality of RRHs.

The second antenna branch may be kept active in at least one of the plurality of RRHs.

According to a third aspect there is presented an RRH controller node for saving power in RRHs of a wireless communication system. The RRH controller node is associated with a plurality of RRHs for the same cell, each of the plurality of RRHs having at least a first antenna branch of the cell and a second antenna branch of the cell. The RRH controller node comprises a communication manager for providing a first power saving indication to a first RRH of the plurality of RRHs, to inactivate its first antenna branch, and for providing a second power saving indication to a second RRH of the plurality of RRHs, to inactivate its second antenna branch, wherein at least one antenna branch is kept active in the first and second RRH.

According to a fourth aspect there is presented a computer program for saving power in remote radio heads (RRHs) of a wireless communication system. An RRH controller node is associated with a plurality of RRHs for the same cell, each of the plurality of RRHs having at least a first antenna branch of the cell and a second antenna branch of the cell. The computer program comprising computer program code which, when run in the RRH controller node, causes the RRH controller node to provide a first power saving indication to a first RRH of the plurality of RRHs, to inactivate its first antenna branch, and to provide a second power saving indication to a second RRH of the plurality of RRHs, to inactivate its second antenna branch, wherein at least one antenna branch is kept active in the first and second RRH.

A computer program product comprising a computer program and a computer readable storage means on which the computer program is stored is also presented.

Generally, all terms used in herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Remote radio heads (RRHs) connected to the same radio base station can be arranged to share the same cell. In this way, a single radio base station can provide coverage in different parts of a building by placing the RRHs appropriately. Moreover, a wireless terminal can move between the coverage of different RRHs while staying within the same cell, thus avoiding causing handovers. The wireless terminal will not realize that it is served by different RRHs, but see it as one single cell.

When uplink (UL) signals from RRHs are in the analogue domain, and these are combined in a combiner, this combination can occur coherently or non-coherently. The same applies to the digital domain. In coherent combining, phases of the distorted desired signals are aligned prior to combining by multiplying the distorted desired signals with conjugates of respective channel estimations, increasing the signal-to-interference plus noise-ratio (SINR) of the combined signal. Several combining algorithms are available for coherent combining, including maximum-ratio combining and equal-gain combining. On the other hand, for non-coherent combining, there is no phase alignment for the distorted desired signals, and the combined signal is simply the sum of all received signals. Therefore, the SINR in linear domain of the non-coherently combined signal will be equal to a linear combination, or a weighted average, of the SINRs of individual received signals.

Hence, for non-coherent combining, when one or several RRHs receive strong interference, the overall SINR is substantially degraded. Also, by combining the signal from many RRHs, the total noise level will increase from addition of the thermal noise in each receiver chain. Noise-limited scenarios (e.g. cell border at low load) may also degrade performance.

Figure 5:
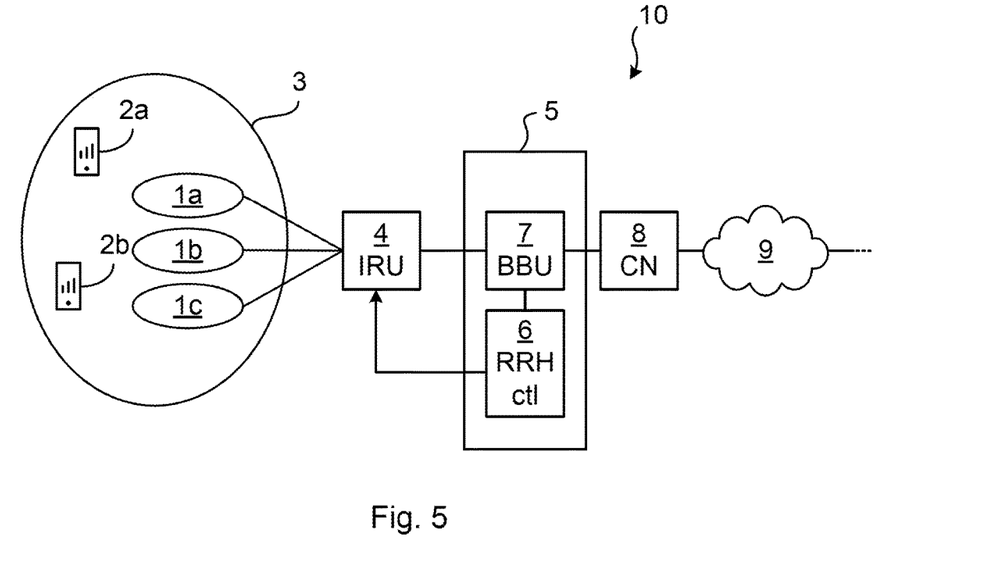
FIG. 5 is a schematic diagram illustrating an environment wherein embodiments presented herein can be applied.

FIG. 5 is a schematic diagram illustrating an environment where embodiments presented herein can be applied. A wireless communication system 10 comprises a number of RRHs 1a-c for installation in locations where traditional deployment with antennas being co-located with a base station 5 is not ideal. For example, the wireless communication system 10 can be installed indoors, such as in an office, shopping centre, train station or airport.

It is to be noted that, while the embodiments presented herein are described as implemented using LTE (Long Term Evolution) and/or W-CDMA (Wideband Code Division Multiplex), any applicable communication standard may be used, such as any one or a combination of LTE-SAE (Long Term Evolution-System Architecture Evolution), GSM (Global System for Mobile communication), EDGE (Enhanced Data Rates for GSM Evolution), GPRS (General Packet Radio Service), CDMA2000 (Code Division Multiple Access 2000), or any other current or future wireless network, such as LTE-Advanced or 5G NR (New Radio), as long as the principles described hereinafter are applicable.

The base station 5 here comprises a baseband unit (BBU) 7 and an RRH controller 6. An intermediate radio unit (IRU) 4 is used in the UL to combine UL signals from the plurality of RRHs 1a-c and forward data to the BBU 7. In downlink (DL), the IRU 4 may function as a splitter, providing DL signals from the BBU 7 to each one of the connected RRHs 1a-c. It is to be noted that though the IRU 4 often is used indoors, it may also be provided outdoors whenever appropriate. The IRU 4 is in this way a link for a number (in this example three) of RRHs 1a-c. In this way, the base station 5 is a link for UL and DL communication for the RRHs connected to the IRU 4.

It is to be noted that the IRU 4 may be provided separate from the base station 5 as shown in FIG. 5, but the IRU 4 may also be provided as part of the base station 5.

The base station 5 is also connected to a core network 8. The core network 8 provides central functions and connectivity to external networks 9 such as the Internet.

The RRHs 1a-c connected to the IRU 4 are part of a single radio cell 3 and thus share a cell identifier. Antennas do not in this embodiment need to be included in the base station 5 or the IRU 4, as the RRHs 1a-c provide the antennas for the wireless link to one or more wireless terminals (WT) 2a-b. The wireless link provided by the RRHs 1a-c includes both DL communication to the WTs 2a-b and UL communication from the WTs 2a-b. The WT may e.g. be a mobile communication terminal, user equipment (wireless device), station (STA), mobile terminal, user terminal, user agent, machine-to-machine devices etc., and can be, for example, what today is commonly known as a mobile phone, smart phone or a tablet/laptop with wireless connectivity or fixed mounted terminal.

In radio communication systems, the data is transmitted and received over the air at a specific radio frequency—either the same for transmission and reception or on separate frequencies. This is often called the radio frequency (RF) or the carrier frequency.

There are many different carrier frequencies, depending on regional spectrum allocation and spectrum license rights. To create a common radio implementation supporting this variety of carrier frequencies over an analogue interface between IRU and RRH, a second set of frequencies is used herein, denoted the Intermediate Frequency (IF), which is used for communication on the cables between the IRU 4 and the RRHs 1a-c. For a digital interface between IRU and RRH using e.g. complex baseband signals in the digital domain, digital-to-analogue and analogue-to-digital conversions may be done in the RRH.

It is to be noted that the processing of UL and DL signals in the IRU 4 and the RRHs 1a-c do not need to occur in the digital domain and may be performed completely in the analogue domain.

The RRHs 1a-c convert from IF or digital baseband to RF for DL transmission and from RF to IF or digital baseband for UL reception. Conversely, for an analogue interface between IRU and RRH, the IRU 4 converts from digital baseband to IF for DL transmission and from IF to digital baseband for UL reception. For a digital interface between IRU and RRH, digital-to-analogue and analogue-to-digital conversions may be done in the RRH By using IF or digital baseband instead of RF over the cables between the IRU 4 and the RRHs 1a-c, cheaper, widely deployed electrical cables can be used, such as Ethernet local area network (LAN) cabling. In this way, existing indoor cabling can many times be reused during installation, which significantly saves cost, installation time and complexity. Optionally, the RRHs 1a-c are also powered over the respective cables, e.g. power over ethernet (PoE).

The link between the IRU 4 and the BBU 7 may utilise a digital signal interface, such as CPRI (Common Public Radio Interface) or eCPRI.

The RRH controller 6 controls how the UL signals from the RRHs 1a-c are combined in the IRU 4, as described in more detail below.

It is to be noted that, although FIG. 5 shows the BBU 7 connected to one IRU 4, each BBU 7 may be connected to several IRUs over separate links or using cascaded links.

It is to be noted that while the embodiment of FIG. 5 shows three RRHs 1a-c, there may be fewer or more RRHs connected to each IRU 4.

Figure 6:
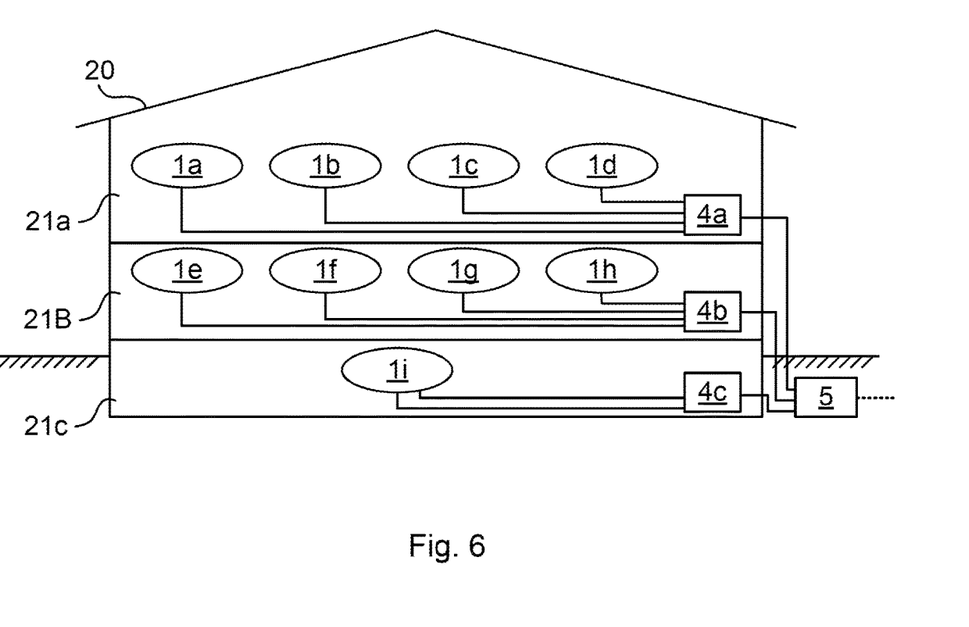
FIG. 6 is a schematic diagram illustrating an environment wherein embodiments presented herein can be applied.

FIG. 6 is a schematic diagram illustrating an example deployment of RRHs in a multi-storey building 20. The building 20 here has a first floor 21a, a ground floor 21b and a basement 21c. On the first floor 21a, there are a first RRH 1a, a second RRH 1b, a third RRH 1c and a fourth RRH 1d, all connected to a first IRU 4a. On the ground floor 21b, there are a fifth RRH 1e, a sixth RRH 1f, a seventh RRH 1g and an eighth RRH 1h all connected to a second IRU 4b. In the basement 21c, there is only a ninth RRH 1i connected to a third IRU 4c. Each one of the IRUs 4a-c is connected to the base station 5 (and its one or more BBUs) via a respective digital (e.g. CPRI) link.

An efficient way for saving power in remote radio heads (RRHs), where more than one RRH belong to the same cell, is presented. The RRHs are part of a wireless communication system, wherein the multiple RRHs are actively combined/split, such as in certain Distributed Antenna Systems (DAS). With active combining/splitting it is here meant a system that uses UL combining and/or DL splitting for multiple RRHs and where it is possible to enable and disable individual RRH antenna branches without manual connection and disconnection of equipment.

Active combining/splitting of multiple smaller access points with lower power, here RRHs, is often used to achieve more uniform coverage and capacity over a desired service area, compared to using a single high-power access point for the desired service area. Also, for indoor environments, regulatory restrictions impose limits on the output power per access point for safety reasons. Compared to a case where each RRH is a different cell, active combining/splitting has lower theoretical capacity but also much fewer cell borders, which means fewer handovers and less inter-cell interference.

Enabling/disabling individual RRH antenna branches for combining and/or splitting may be done in different ways, such as through relays, analogue switches, digital switches or software, and details thereof are not discussed further herein. Active combining and splitting may also involve amplifiers and other functions in the RRHs.

Figure 1:
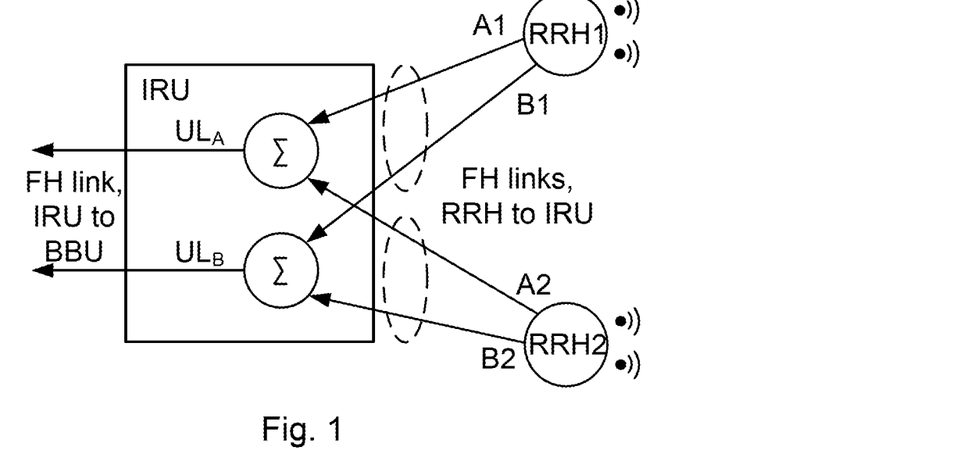
FIG. 1 is a schematic diagram illustrating an architecture for remote radio heads.

FIG. 1 shows an example of a system architecture with active combining in the IRU. The IRU is supports two antenna branches A and B, and is connected to two RRHs, RRH1 and RRH2. RRH1 supports the two antenna branches A and B, here denoted A1 and B1, and similarly RRH2 also supports the two antenna branches A and B, here denoted A2 and B2. The RRH1 antenna branch A1 is in the $UL_A$ combined, in the IRU, with the RRH2 antenna branch A2. And correspondingly, the RRH1 antenna branch B1 is in the $UL_B$ combined, in the IRU, with the RRH2 antenna branch B2. The RRHs have two antennas each to be able to communicate wirelessly with wireless terminal over the two separate communication links $UL_A$ and $UL_B$.

The fronthaul (FH) links may be analogue or digital as mentioned above. In practice, some processing and/or interface handling functions is needed for the FH links, but this has been omitted to not obscure the rest. If the FH links are digital, there may also be a network with multiple nodes (e.g. switches) between the IRU and the RRHs. Other media may be used for the FH links, e.g. local area network, LAN, cables, coaxial cables, optical fibre, or millimetre wave wireless links.

RRHs typically contain some parts that are shared by multiple antenna branches (e.g. A1 and B1), e.g. FH interface, power supply, central processing unit (CPU), and clock generation. Parts that are shared by multiple branches in an RRH cannot be disabled as long as some of its branches are active, which means that these parts' power consumption will not be reduced significantly by methods presented herein. Some reduction might still be possible, e.g. from lower CPU load or lower output power in the power supply. Other parts in RRHs are either separate per branch or have dedicated signal paths per branch, e.g. power amplifier (PA) for DL, low noise amplifier (LNA) for UL, RF transceiver including up-/downconverters and active or digital filters. Power consumption for such other parts, may be controlled by methods presented herein and will contribute to significant power savings.

To reduce BBU processing and FH capacity requirements, UL signals from multiple RRHs may be combined in the IRU as shown in FIG. 1. One IRU may contain one or more independent combining groups, e.g. for different multiple-input multiple-output (MIMO) branches, sectors, or cells. If combining is done on IQ samples (in-phase and quadrature samples) in time domain, it is difficult to do coherent combining, especially for multicarrier signals, e.g. for orthogonal frequency division multiplexing (OFDM) as used in 4G and 5G wireless communications. In the frequency domain, it is easier to do coherent combining, but it requires equalization, which adds complexity to the IRU. For non-coherent combining, there is a penalty when adding signals since thermal receiver noise contributions from the different RRHs are also added. Thus, by adding signals from branch A1 on RRH1 and A2 on RRH2 with equal gain, the noise figure (NF) increases by 3 dB. If signals from four RRHs are added, the NF increases by 6 dB and so on.

Similarly, in DL, a number of RRHs belonging to one DL splitting group will transmit the same signals. This can be represented by reversing the signal path in FIG. 1 and replacing the summing with a signal splitter (analogue or digital). This may be done in the same IRU as for the illustrated UL.

In UL, the IRU combines signals per antenna branch, e.g. for 2-16 RRHs. Here, only two antenna branches per RRH are shown but the presented methods are not limited to two branches. With four antenna branches, there will be more flexibility.

$$UL_A = A1 + A2;$$

$$UL_B = B1 + B2;$$

Unused inputs to the combiners may be disabled (muted) if fewer than the maximum number of supported RRHs are used, e.g. for small deployments. By muting inputs, any noise contribution from the FH or the first stages of the IRU are suppressed. This is especially beneficial for analogue combining but may also save some computations for digital combining.

Non-coherent combining in the IRU means that doubling of the number of RRHs per branch increases UL NF by 3 dB, which is true for both analogue and digital combining.

In the following, performance is assessed using Signal-to-Noise Ratio (SNR) instead of SINR in order to simplify the analysis, i.e. interference between cells or sectors is not included. At low load, interference will be low anyway, which means SNR will be similar to SINR.

The presented power-saving can be used e.g. when traffic load is low, when there is a risk of overheating in RRHs (e.g. due to extreme ambient temperature), and/or when there is a risk of exceeding capacity of a power supply. Triggering of power-saving may be when traffic load is low, but it may also be triggered from e.g. equipment overheating caused by unusually high ambient temperature and/or malfunctioning climate control in a building.

For normal operation, at high traffic load, all antenna branches should be on in all RRHs. DL and UL operation during normal operation are described as follows, with reference to FIG. 2.

DL Operation

Figure 2:
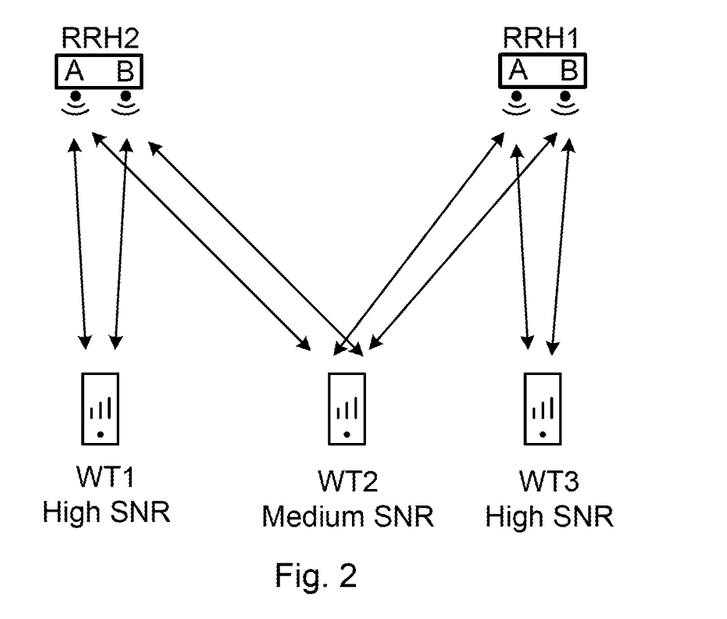
FIG. 2 is a schematic diagram illustrating operation without power saving.

RRH1 and RRH2 transmit the same signals, A and B, to WT1, WT2 and WT3.

Each WT receives the power combined signals A and B, respectively, per branch. WT1-WT3 may use diversity reception or MIMO reception of branches A and B.

UL Operation

Signals transmitted from WT1-WT3 are received by the RRH1 and/or RRH2. Combining per branch A and B is performed in the IRU before baseband processing is performed. This implies 3 dB NF increase compared with a case where only one RRH would be connected to the IRU. The BBU performs UL diversity or UL MIMO processing on branch A and B.

Figure 3:
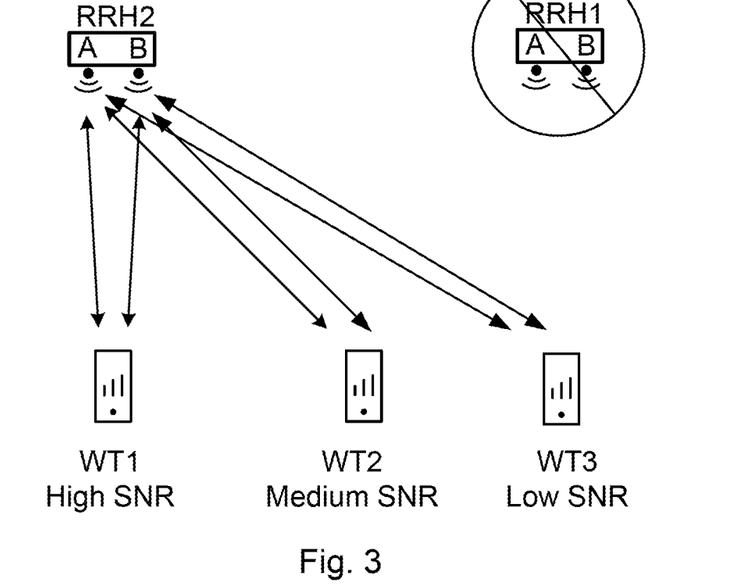
FIG. 3 is a schematic diagram illustrating operation with power saving according to prior art.

At low traffic load, a prior art saving power approach would be switching off some RRHs completely, as illustrated in FIG. 3, where half the number of the RRHs are disabled, RRH1 in this case. This leads to large performance variation over the service area, which is often undesirable. This will lead to a large power saving, with fewer signals to combine in IRU, which means that UL NF can be reduced (here by 3 dB). The WTs near an active RRH (here WT1 near RRH2) will not lose SNR, WTs (WT2) halfway between RRHs will lose on average 3 dB power and SNR, and WTs (WT3) near a disabled RRH will experience large decrease in power and SNR. Received power, and SNR, at this location (for WT3) could drop 20-50 dB, depending on propagation conditions and distance between the RRHs. Disabling some RRHs completely thus causes large performance variation over the service area.

Figure 4:
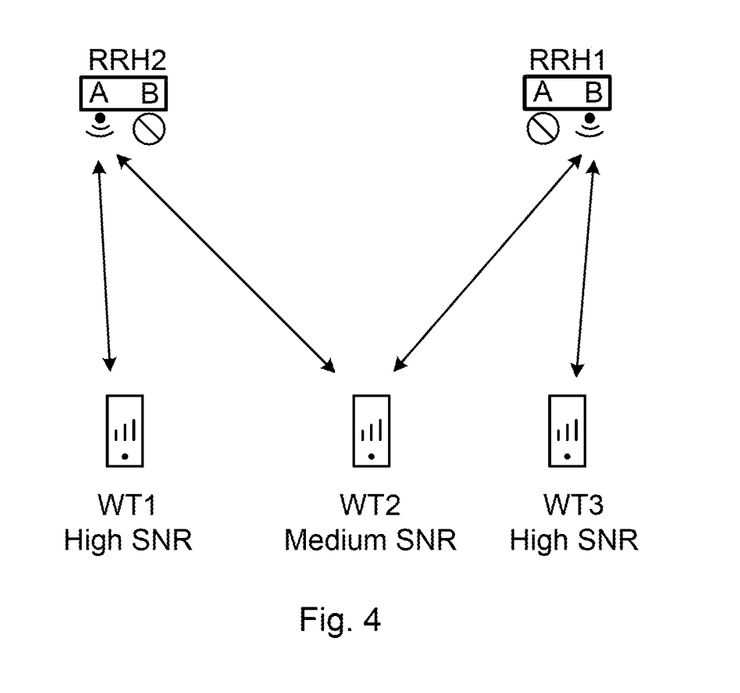
FIG. 4 is a schematic diagram illustrating operation with power saving according to an embodiment presented herein.

As presented herein, instead of disabling some RRHs completely, by keeping at least one antenna branch active in every RRH, performance variations are significantly reduced at the same time providing substantial power savings. Adjacent RRHs may further disable different branches, which approach is illustrated in FIG. 4.

DL Operation

RRH1 and RRH2 transmit different signals, A and B, respectively, to WT1, WT2 and WT3.

Each WT receives signals A and/or B, respectively. The WT2 may use diversity reception or MIMO reception of branches A and B, whereas WT1 and WT3 only receive branches A or B. For an additive white gaussian noise (AWGN) channel, WT1 and WT3 would lose 3 dB SNR if half the number of branches are lost. For a fading channel, the loss may be larger since diversity gain is also lost but WT1 and WT3 typically have low path loss to the RRH so they can still get good performance.

UL Operation

Signals transmitted from WT1-WT3 are received by the RRH1 and/or RRH2. Combining per branch A and B is performed in the IRU before baseband processing is performed. This implies 3 dB NF decrease for WT1-WT3. The BBU performs UL diversity or UL MIMO processing on branch A and B.

A method for saving power in RRHs is presented, which switches off (mutes) alternating antenna branches (for UL and/or DL) for adjacent RRHs within the same cell. By adjacent RRHs is meant RRHs with partially overlapping coverage area. If half the number of branches is disabled in the RRHs, 3 dB power, and SNR, is lost but performance difference over their combined coverage area does not increase significantly and distributed MIMO (D-MIMO) may be used between adjacent RRHs to give more uniform performance over their combined coverage area, mitigating diversity loss for WTs in the areas where RRH coverage is overlapping. Further, inputs corresponding to disabled antenna branches may be excluded in the UL combiner, allowing 3 dB reduction of the NF, thus mitigating the SNR loss.

By the presented embodiment of saving power in RRHs, the following advantages are achieved. Uniform performance over the combined coverage area, wherein power and SNR variation over the area is much smaller than if some RRHs are switched off completely. Radio performance is improved by exploiting D-MIMO, which may be used to improve radio performance in a power-saving state, mitigating at least part of the performance reduction (e.g. diversity gain) from fewer branches. SNR loss from muted UL branches is mitigated by adding fewer signals per branch in the UL combiner, thus decreasing noise figure.

Methods according to embodiments presented herein have the following properties:

Somewhat smaller power saving than disabling complete RRHs since common parts like CPU and clocks etc. are still running in each RRH. For WTs near an RRH, 3 dB power/SNR is lost when half the number of antenna branches are disabled, for an AWGN channel. For fading channels the loss may be higher than 3 dB. For WTs halfway between RRHs will lose on average 3 dB power and SNR when half the number of antenna branches are disabled, however if adjacent RRHs disable different branches, these WTs may be able to use D-MIMO. By disabling alternating branches instead of same branch in all RRHs, NF in UL can be reduced by combining fewer signals in the IRU. Unused combiner inputs (here: B2 and A1) may be switched off.

Performance variation over the service area does not increase with the presented method, and even though the overall performance is reduced WTs in locations with low performance will experience smaller reduction.

By keeping each MIMO branch active in at least one RRH, MIMO operation is still possible in some areas (i.e. do not disable branch A in all RRHs at the same time).

If the wireless communication system and its RRHs have more than two antenna branches, it is possible to have multiple steps of saving power. Below is an example where RRHs have four antenna branches each. As before, adjacent RRHs should disable different branches when possible:

1. Highest traffic load: Normal operation, all branches active.
2. High traffic load: 1 branch disabled per RRH: up to 25% power saving, 1.2 dB DL SNR loss.
3. Medium traffic load: 2 branches disabled per RRH: up to 50% power saving, 3 dB DL SNR loss.
4. Low traffic load: 3 branches disabled per RRH: up to 75% power saving, 6 dB DL SNR loss.

In practice, power saving numbers might be smaller than the above since some parts, like CPU and clocks, are typically shared between branches and cannot be disabled unless all branches are disabled. However, substantial power savings are still possible since PAs, LNAs, and RF transceiver chains for one or more branch can be completely disabled.

It is not necessary that all RRHs disable the same number of branches. If traffic load can be determined per RRH, e.g. from UL power measurement or other means, more branches could be disabled for RRHs with low traffic load than for RRHs with high traffic load. It is also possible to disable more branches in areas where coverage is good and fewer branches in areas where coverage is bad. Branches can also be disabled for other reasons than low load, e.g. to be able to maintain wireless service in abnormal ambient temperatures. In the latter case, branches may first be disabled in RRHs with high operating temperature. For wireless communication systems, the following power-saving steps may be taken:

1. Power saving triggered, e.g. by low load, over temperature, or other reason.
2. Determine which RRHs to apply power saving to.
3. Determine which branches in the RRHs to disable.
4. Disable selected branch(es) in selected RRH(s).

Enabling of branches that have previously been disabled may be performed in a corresponding manner. In this case, triggers may e.g. be increased load, reduced temperature, or a timer that expired.

Even though it may be more useful to disable both UL and DL for one branch in an RRH, it is also possible to disable only UL or DL in one branch in an RRH. Disabling of branch A in DL and branch B in UL is also possible.

Figure 7:
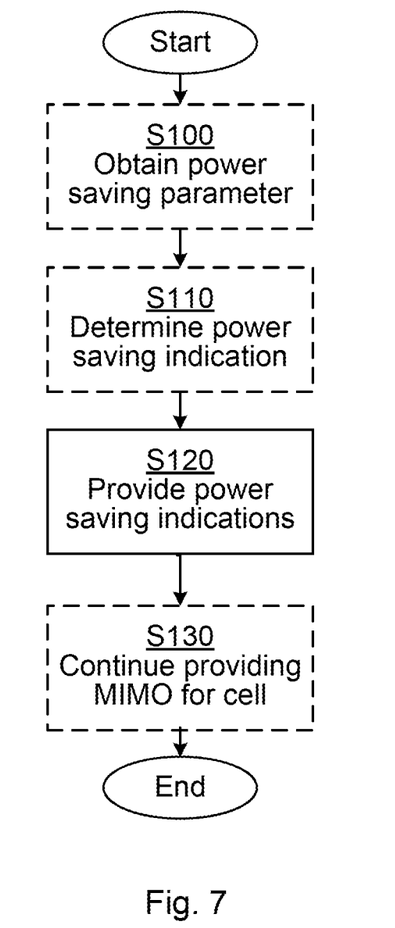
FIG. 7 is a flow chart illustrating methods for embodiments presented herein.

A method for saving power in RRHs of a wireless communication system is presented with reference to FIG. 7. The method is performed in an RRH controller node 6 associated with a plurality of RRHs 1 for the same cell 3, each of the plurality of RRHs having at least a first antenna branch A of the cell and a second antenna branch B of the cell. The method comprises providing S120 a first power saving indication to a first RRH 1a of the plurality of RRHs, to inactivate its first antenna branch A1, and providing S120 a second power saving indication to a second RRH 1b of the plurality of RRHs, to inactivate its second antenna branch B2, wherein at least one antenna branch is kept active in the first and second RRH.

The uplink signals received in the same antenna branch (either branch A or branch B) from the plurality of RRHs are combined to one UL signal of the cell in the IRU. Correspondingly, the downlink signals of the same antenna branch (either branch A or branch B) of the cell are broadcasted from the IRU to the corresponding antenna branches of the plurality of the RRHs. In other words, the cell has MIMO branches A and B, which each RRH is connected to and uses to communicate with WTs. The plurality of RRHs has antenna branches A1, A2 and B1, B2 that are mapped to the cell's antenna branches A and B through combining/splitting. The mapping may be controlled by the RRH or the IRU.

The first power saving indication may e.g. comprise an instruction to inactivate antenna branch A, and the second power saving indication may e.g. comprise an instruction to inactivate antenna branch B.

The term split here applies to both analogue signal splitting and digital signal splitting (e.g. digital broadcasting or copying of signals).

With the term inactivate an antenna branch of an RRH is meant that the hardware components associated to a specific branch only of a RRH is turned off.

The plurality of RRHs may be coupled to an intermediate radio unit, IRU, for the cell, the IRU 4 comprises a combiner for each of the antenna branches in the uplink direction, and the method may further comprise providing S120 an inactivation indication to the IRU, to inactivate its combiner inputs corresponding to the first antenna branch A1 of the first RRH1 and the second antenna branch B2 of the second RRH2.

Such a combining function may be done e.g. in analogue electronics, in software, in a field-programmable gate array (FPGA) or digital frontend (DFE) ASIC. The function may also be a combiner/splitter, wherein the combiner is used in UL and the splitter is used for DL.

The antenna branches may be inactivated by muting or disabling.

The first and second RRH may be adjacent RRHs with partially overlapping coverage areas.

The method may further comprise obtaining S100 power saving parameters of the cell, and determining S110 the first and second power saving indications based on the obtained power saving parameters. The power saving parameters may comprise one or more of the following: traffic load, presence detection, aggregated power, individual RRH power, temperature, timeout, and configuration change. The determination step S110 may be based on one or more of the following: deployment planning, signal strength measurement, randomness, and timeout, as well as applying machine learning to refine the determination over time. The machine learning may e.g. be based on WT reporting, base station measurements, or performance indicators.

The RRH controller node 6 may be implemented in one or more of the following nodes: RRH 1, IRU 4, base station 5, core network 8, and external network 9.

The first antenna branch A may be kept active in at least one of the plurality of RRHs.

The second antenna branch B may be kept active in at least one of the plurality of RRHs.

A method for saving power in RRHs of a wireless communication system is presented with reference to FIG. 7. The method is performed in an RRH controller node 6 associated with a plurality of RRHs 1 for the same cell 3, each of the plurality of RRHs having at least a first antenna branch A of the cell and a second antenna branch B of the cell. The method comprises providing S120 a first power saving indication to a first RRH 1a of the plurality of RRHs, to reduce its power consumption by adjusting its antenna branch configuration, and providing S120 a second power saving indication to a second RRH 1b of the plurality of RRHs, to reduce its power consumption by adjusting its antenna branch configuration, wherein the first RRH and the second RRH are neighbour RRHs with overlapping coverage, and the adjusted antenna branch configuration of the first RRH differs from the adjusted antenna branch configuration of the second RRH, and wherein at least one antenna branch is kept active in each of the first and second RRH.

A method for saving power in RRHs of a wireless communication system is presented with reference to FIG. 7. The method is performed in an RRH controller node 6 associated with a plurality of RRHs 1 for the same cell 3, each of the plurality of RRHs having at least a first antenna branch A of the cell and a second antenna branch B of the cell. The method comprises providing S120 a first power saving indication to a first RRH 1a of the plurality of RRHs, to reduce its power consumption by inactivating antenna branch A, and providing S120 a second power saving indication to a second RRH 1b of the plurality of RRHs, where the second RRH has overlapping coverage with the first RRH, to reduce its power consumption by inactivating an antenna branch selected to not decrease the D-MIMO rank in the partially overlapped area, and wherein at least one antenna branch is kept active in each of the first and second RRH.

Figure 8:
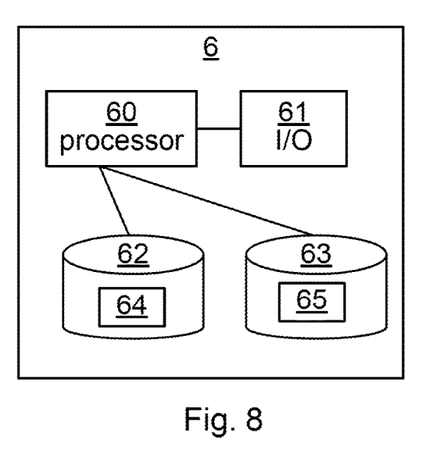
FIG. 8 is a schematic diagram illustrating some components of devices presented herein.

An RRH controller node 6 for saving power in RRHs of a wireless communication system is presented with reference to FIG. 8. The RRH controller node is associated with a plurality of RRHs 1 for the same cell 3, each of the plurality of RRHs having at least a first antenna branch A of the cell and a second antenna branch B of the cell. The RRH controller node comprises a processing circuitry 60, and a computer program product 62, 63 storing instructions 64, 65 that, when executed by the processing circuitry, causes the RRH controller node to provide a first power saving indication to a first RRH 1a of the plurality of RRHs, to inactivate its first antenna branch A, and to provide a second power saving indication to a second RRH 1b of the plurality of RRHs, to inactivate its second antenna branch B, wherein at least one antenna branch is kept active in the first and second RRH.

The plurality of RRHs may be coupled to an IRU for the cell, the IRU 4 comprising a combiner for each of the antenna branches in the uplink direction. The RRH controller node may further be caused to provide an inactivation indication to the IRU, to inactivate its combiner inputs corresponding to the first antenna branch of the first RRH and the second antenna branch of the second RRH.

The RRH controller node may further be caused to obtain power saving parameters of the cell, and to determine the first and second power saving indications based on the obtained power saving parameters. The power saving parameters may comprise one or more of the following: traffic load, presence detection, aggregated power, individual RRH power, temperature, timeout, and configuration change. The determination action may be based on one or more of the following: deployment planning, signal strength measurement, randomness, and timeout, as well as applying machine learning to refine the determination over time.

The first antenna branch A may be kept active in at least one of the plurality of RRHs.

The second antenna branch B may be kept active in at least one of the plurality of RRHs.

FIG. 8 is a schematic diagram showing some components of the RRH controller node 6. The processing circuitry 60 may be provided using any combination of one or more of a suitable central processing unit, CPU, multiprocessing circuitry, microcontroller, digital signal processing circuitry, DSP, application specific integrated circuit etc., capable of executing software instructions of a computer program 64 stored in a memory. The memory can thus be considered to be or form part of the computer program product 62. The processing circuitry 60 may be configured to execute methods described herein with reference to FIG. 7.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 63 in the form of a data memory may also be provided, e.g. for reading and/or storing data during execution of software instructions in the processing circuitry 60. The data memory can be any combination of read and write memory, RAM, and read only memory, ROM, and may also comprise persistent storage, which, for example, can be any single one or combination of magnetic memory, optical memory, solid state memory or even remotely mounted memory. The data memory may e.g.

hold other software instructions 65, to improve functionality for the RRH controller node 6.

The RRH controller node 6 may further comprise an input/output (I/O) interface 61 including e.g. a user interface. The RRH controller node 6 may further comprise a receiver configured to receive signalling from other nodes, and a transmitter configured to transmit signalling to other nodes (not illustrated). Other components of the RRH controller node 6 are omitted in order not to obscure the concepts presented herein.

Figure 9:
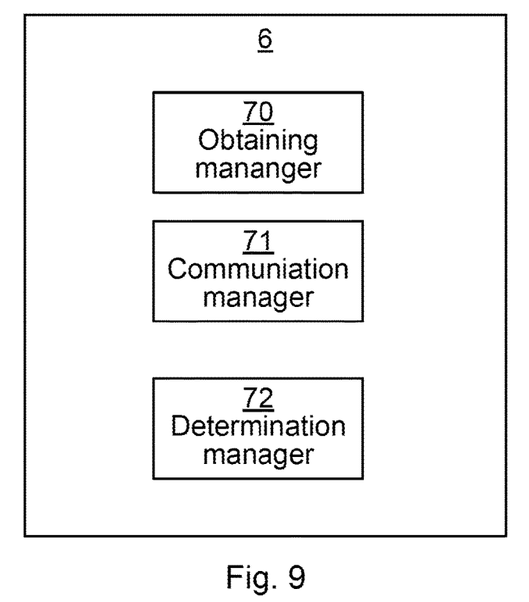
FIG. 9 is a schematic diagram illustrating functional module of devices presented herein.

An RRH controller node 6 for saving power in RRHs of a wireless communication system is presented with reference to FIG. 9. The RRH controller node is associated with a plurality of RRHs 1 for the same cell 3, each of the plurality of RRHs having at least a first antenna branch A of the cell and a second antenna branch B of the cell. The RRH controller node comprises a communication manager 71 for providing a first power saving indication to a first RRH 1a of the plurality of RRHs, to inactivate its first antenna branch A, and for providing a second power saving indication to a second RRH 1b of the plurality of RRHs, to inactivate its second antenna branch B, wherein at least one antenna branch is kept active in the first and second RRH.

FIG. 9 is a schematic diagram showing functional blocks of the RRH controller node 6. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the method illustrated in FIG. 7, comprising an obtaining manager unit 70, a communication manager unit 71 and a determination manger unit 72. In the embodiments where one or more of the modules are implemented by a computer program, it shall be understood that these modules do not necessarily correspond to process modules, but can be written as instructions according to a programming language in which they would be implemented, since some programming languages do not typically contain process modules.

The obtaining manger 90 is for saving power in an RRH. This module corresponds to the step S100 of FIG. 7. This module can e.g. be implemented by the processing circuitry 60 of FIG. 8, when running the computer program.

The communication manager 71 is for saving power in an RRH. This module corresponds to the step S110 of FIG. 7. This module can e.g. be implemented by the processing circuitry 60 of FIG. 8, when running the computer program.

The determination manger 72 is for saving power in an RRH. This module corresponds to the steps S120, and S130 of FIG. 7. This module can e.g. be implemented by the processing circuitry 60 of FIG. 8, when running the computer program.

A computer program 64, 64 for saving power in RRHs of a wireless communication system is presented with reference to FIG. 7. An RRH controller node 6 is associated with a plurality of RRHs 1 for the same cell 3, each of the plurality of RRHs having at least a first antenna branch A of the cell and a second antenna branch B of the cell. The computer program comprises computer program code which, when run in the RRH controller node, causes the RRH controller node to provide S120 a first power saving indication to a first RRH 1a of the plurality of RRHs, to inactivate its first antenna branch A, and to provide S120 a second power saving indication to a second RRH 1b of the plurality of RRHs, to inactivate its second antenna branch B, wherein at least one antenna branch is kept active in the first and second RRH.

A computer program product 62, 63 comprising a computer program 64, 65 and a computer readable storage means on which the computer program 64, 65 is stored, is also presented.

The invention has mainly been described above with reference to a few embodiments. However, as is readily appreciated by a person skilled in the art, other embodiments than the ones disclosed above are equally possible within the scope of the invention, as defined by the appended claims.

The invention claimed is:

1. A method for saving power in remote radio heads, RRHs, of a wireless communication system, the method being performed in an RRH controller node associated with a plurality of RRHs for the same cell, each of the plurality of RRHs having at least a first antenna branch (A) of the cell and a second antenna branch (B) of the cell, the method comprising:
   providing (S120) a first power saving indication to a first RRH of the plurality of RRHs, to inactivate its first antenna branch (A); and
   providing (S120) a second power saving indication to a second RRH of the plurality of RRHs, to inactivate its second antenna branch (B);
   wherein at least one antenna branch is kept active in the first and second RRH.

2. The method according to claim 1, wherein the plurality of RRHs are coupled to an intermediate radio unit, IRU, for the cell, the IRU comprising a combiner for each of the antenna branches in the uplink direction, the method further comprising:
   providing (S120) an inactivation indication to the IRU, to inactivate its combiner inputs corresponding to the first antenna branch of the first RRH and the second antenna branch of the second RRH.

3. The method according to claim 1, wherein the antenna branches are inactivated by muting or disabling.

4. The method according to claim 1, wherein the first and second RRH are adjacent RRHs with partially overlapping coverage areas.

5. The method according to claim 1, further comprising:
   obtaining (S100) power saving parameters of the cell; and
   determining (S110) the first and second power saving indications based on the obtained power saving parameters.

6. The method according to claim 5, wherein the power saving parameters comprises one or more of the following: traffic load, presence detection, aggregated power, individual RRH power, temperature, timeout, and configuration change.

7. The method according to claim 5, wherein the determination step is based on one or more of the following: deployment planning, signal strength measurement, randomness, and timeout, as well as applying machine learning to refine the determination over time.

8. The method according to claim 1, wherein the RRH controller node is implemented in one or more of the following nodes: RRH, IRU, base station, core network, and external network.

9. The method according to claim 1, wherein the first antenna branch is kept active in at least one of the plurality of RRHs.

10. The method according to claim 1, wherein the second antenna branch is kept active in at least one of the plurality of RRHs.

11. A remote radio head, RRH, controller node for saving power in RRHs of a wireless communication system, the RRH controller node being associated with a plurality of RRHs for the same cell, each of the plurality of RRHs having at least a first antenna branch (A) of the cell and a second antenna branch (B) of the cell, the RRH controller node comprising:
- a processing circuitry; and
- a computer program product storing instructions that, when executed by the processing circuitry, causes the RRH controller node to:
- provide a first power saving indication to a first RRH of the plurality of RRHs, to inactivate its first antenna branch (A); and
- provide a second power saving indication to a second RRH of the plurality of RRHs, to inactivate its second antenna branch (B);
- wherein at least one antenna branch is kept active in the first and second RRH.

12. The RRH controller node according to claim 11, wherein the plurality of RRHs are coupled to an intermediate radio unit, IRU, for the cell, the IRU comprising a combiner for each of the antenna branches in the uplink direction, the RRH controller node further caused to:
- provide an inactivation indication to the IRU, to inactivate its combiner inputs corresponding to the first antenna branch of the first RRH and the second antenna branch of the second RRH.

13. The RRH controller node according to claim 11, wherein the antenna branches are inactivated by muting or disabling.

14. The RRH controller node according to claim 11, wherein the first and second RRH are adjacent RRHs with partially overlapping coverage areas.

15. The RRH controller node according to claim 11, further caused to:
- obtain power saving parameters of the cell; and
- determine the first and second power saving indications based on the obtained power saving parameters.

16. The RRH controller node according to claim 15, wherein the power saving parameters comprises one or more of the following: traffic load, presence detection, aggregated power, individual RRH power, temperature, timeout, and configuration change.

17. The RRH controller node according to claim 15, wherein the determination action is based on one or more of the following: deployment planning, signal strength measurement, randomness, and timeout, as well as applying machine learning to refine the determination over time.

18. The RRH controller node according to claim 11, wherein the RRH controller node is implemented in one or more of the following nodes: RRH, IRU, base station, core network, and external network.

19. The RRH controller node according to claim 11, wherein the first antenna branch is kept active in at least one of the plurality of RRHs.

20. The RRH controller node according to claim 11, wherein the second antenna branch is kept active in at least one of the plurality of RRHs.

21. A remote radio head, RRH, controller node for saving power in RRHs of a wireless communication system, the RRH controller node being associated with a plurality of RRHs for the same cell, each of the plurality of RRHs having at least a first antenna branch (A) of the cell and a second antenna branch (B) of the cell, the RRH controller node comprising:
- a communication manager for providing a first power saving indication to a first RRH of the plurality of RRHs, to inactivate its first antenna branch (A), and for providing a second power saving indication to a second RRH of the plurality of RRHs, to inactivate its second antenna branch (B), wherein at least one antenna branch is kept active in the first and second RRH.

22. A non-transitory computer program for saving power in remote radio heads, RRHs, of a wireless communication system, wherein an RRH controller node is associated with a plurality of RRHs for the same cell, each of the plurality of RRHs having at least a first antenna branch (A) of the cell and a second antenna branch (B) of the cell, the non-transitory computer program comprising computer program code which, when run in the RRH controller node, causes the RRH controller node to:
- provide a first power saving indication to a first RRH of the plurality of RRHs, to inactivate its first antenna branch (A); and
- provide a second power saving indication to a second RRH of the plurality of RRHs, to inactivate its second antenna branch (B);
- wherein at least one antenna branch is kept active in the first and second RRH.

23. The non-transitory computer program of claim 22, wherein the RRH controller node is implemented in one or more of the following nodes RRH, IRU, base station, core network, and external network.

* * * * *